United States Patent [19]
Martin

[11] 3,786,740
[45] Jan. 22, 1974

[54] CORN POPPER
[75] Inventor: Wesley G. Martin, Manitowoc, Wis.
[73] Assignee: Aluminum Specialty Company, Manitowoc, Wis.
[22] Filed: Oct. 10, 1972
[21] Appl. No.: 296,113

[52] U.S. Cl. .............................................. 99/323.8
[51] Int. Cl. ............................................. A23l 1/18
[58] Field of Search . 99/323.5, 323.6, 323.7, 323.8, 99/323.9, 323.11

[56] References Cited
UNITED STATES PATENTS
| | | |
|---|---|---|
| 2,081,751 | 5/1937 | Lendrum .......................... 99/323.8 |
| 2,194,852 | 3/1940 | Gundelfinger ..................... 99/323.8 |
| 2,637,656 | 5/1952 | Baunach ........................... 99/323.8 |
| 3,722,399 | 3/1973 | Cole .................................. 99/323.8 |

Primary Examiner—Robert W. Jenkins
Attorney, Agent, or Firm—Raymond E. Fidler et al.

[57] ABSTRACT

A corn popper includes a vessel having a low mass, heat conducting cup mounted in the bottom for holding butter to be melted while popping corn is being popped in the vessel.

9 Claims, 2 Drawing Figures

PATENTED JAN 22 1974  3,786,740

CORN POPPER

The present invention relates in general to corn poppers, and it relates more particularly to a new and improved corn popper of the type including a container mounted within the popper for holding a supply of butter to be melted as the corn is being popped.

BACKGROUND OF THE INVENTION

Cooking vessels for popping corn have been known for many years and more recently such vessels have incorporated containers for melting butter during the popping operation. In one such vessel a butter container is mounted to the inside of the cover and has a perforated bottom to permit the butter to drip down onto the corn while the corn is popping. In another type of popper, a butter container is mounted over the main heating element and a removable cover in the form of an inverted bowl is removably mounted on the flat, heat radiating bottom of the popper. After the corn has been popped and the butter melted, the entire popper is inverted to permit the butter to drip onto the popped corn. An inherent disadvantage of both of these poppers is that all of the corn must be buttered. However, it is not uncommon for some persons to want the popped corn buttered while others in the same group want it unbuttered.

An advantage of the prior art popper having the butter cup at the bottom is the fact that better distribution of the butter on the corn can be achieved. A disadvantage of that popper is, however, that the butter is frequently overheated, particularly where successive batches of corn are popped. Also, the oil used in the popping process collects around the bottom of the butter cup making cleaning difficult and also increasing the heat transferred to the butter with consequent overheating or burning thereof.

OBJECTS OF THE INVENTION

Therefore, an object of the present invention is to provide a new and improved corn popper incorporating a separate butter container for melting butter while the corn is being popped.

Another object of this invention is to provide such a corn popper wherein a portion of the popped corn may be removed prior to buttering.

Still another object of this invention is to provide a new and improved butter cup and popper construction which lessens the likelihood that the butter in the cup will be burned.

A yet further object of this invention is to provide a new and improved corn popper construction which is easy to use and to clean and which can be manufactured at a sufficiently low cost to be competitively marketed.

Briefly, the above and further objects may be realized in accordance with the present invention by providing a vessel in which corn is popped, which vessel has a bottom through which heat is transferred to the corn contained in the vessel and an open top over which a relatively flat cover is disposed; a low mass butter cup having a removable perforated cover mounted in the bottom of the vessel on a raised central portion; and an annular well in the bottom of the vessel for holding cooking oil in spaced relation to the cup. Preferably the cup has an upstanding central area to reduce the area of contact between the cup and the bottom of the vessel to minimize overheating and burning of butter contained in the cup.

BRIEF DESCRIPTION OF THE DRAWING

Further objects and advantages and a better understanding of the invention may be had from the following detailed description taken in connection with the accompanying drawing, wherein.

DETAILED DESCRIPTION OF THE INVENTION

Figure 1:
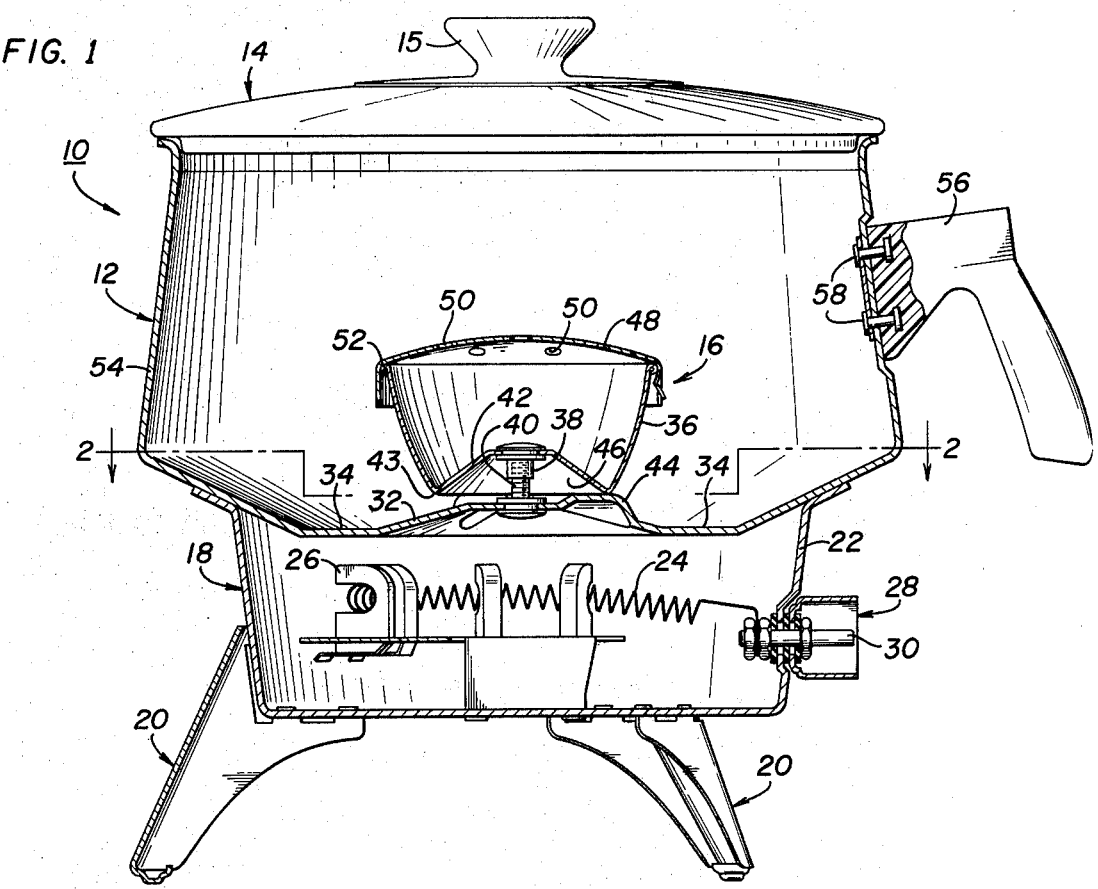
FIG. 1 is a vertically sectioned elevational view of a corn popper embodying the present invention.
Figure 2:
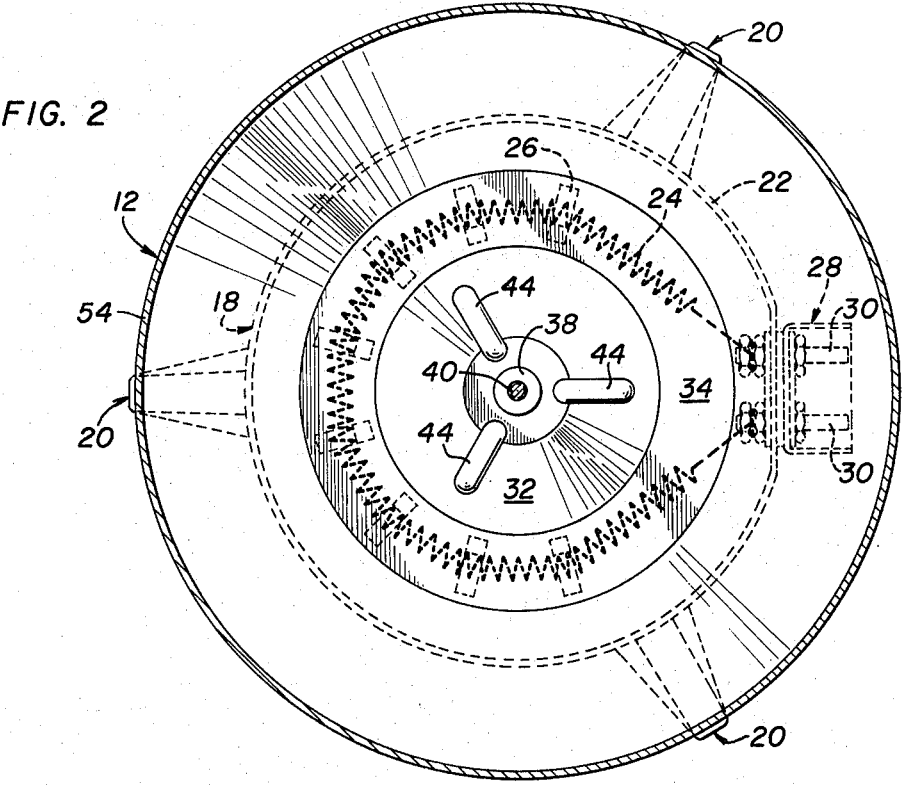
FIG. 2 is a horizontally sectioned view of the corn popper of FIG. 1 taken along the line 2—2 thereof.

Referring now to the drawing, an electrically heated corn popper 10 comprises as its principal elements a metal vessel 12 in which the corn is popped; a generally flat cover 14 having a knob 15 thereon; a butter cup assembly 16 removably mounted in the bottom of the vessel 12; a heating section 18; and a plurality of legs 20. The heating section 18 includes a generally cup-shaped housing 22 welded to the bottom of the vessel 12 to define an enclosed space in which a heating coil 24 is mounted by a plurality of insulators 26 directly below the bottom wall of the vessel 12. A two terminal male connector 28 is mounted in an opening in the side wall of the housing 18 with the two terminals 30 thereof respectively connected to the ends of the coil 24. The legs 20 are fastened as by rivetting to the housing 18.

The bottom wall of the vessel 12 is provided with an upstanding central portion 32 to define an annular recess or well area 34 in which the cooking oil is retained. As best shown in FIG. 1, the depressed annular area 34 is directly above the coil 24 for maximum heat transfer thereto. A thin walled metal cup 36 is mounted on the raised central portion 32 by means of an internally threaded connector 38 depending from the bottom of the cup 36 and an externally threaded stud 40 extending upwardly from the center of the bottom wall of the vessel. The connectors 38 and 40 are respectively rivetted to the cup 36 and to the vessel 12 to fixedly and sealably secure the connectors thereto.

In order to control the rate at which heat is transferred to the butter contained in the cup 36 and to permit relatively rapid cooling of the cup 36 after completion of a popping operation, the cup 36 is preferably formed from a thin sheet of aluminum and has a generally upstanding conical bottom 42 which meets the annular side wall of the cup at a relatively sharp angle as indicated at 43. Additionally, three equally spaced radial ribs 44 are formed in the bottom wall of the vessel to provide small area support surfaces on which the surface 43 of the cup 36 rests. A vented, generally conical space 46 is thus provided between the bottom of the cup 36 and the bottom wall of the vessel.

A cap member 48 having a plurality of holes 50 therein is snap-fitted over an annular bead 52 forming the rim of the cup 36 for keeping the popped corn out of the cup 36. As shown, the vessel 12 has a generally annular side wall 54, and a handle 56 is fastened thereto as by means of a plurality of rivets 58.

OPERATION

In use, a quantity of cooking oil is placed in the recessed bottom portion of the vessel 12 along with the corn to be popped. Butter or oleomargarine is placed in the cup 36 and the cap 48 is snapped thereon. The cover 14, which should be relatively heavy and which is preferably molded of heat resistant glass is then placed on the vessel and electric current is then supplied to the heating coil 24 in the normal manner. The bottom wall of the vessel 12 and particularly the depressed portion 34 is heated by direct radiation from the coil 24 to heat the cooking oil and the corn. Heat is transmitted by conduction from the bottom wall of the vessel 12 to the cup 36 and thus to the butter contained therein. By proper design of the popper the butter is completely melted at about the same time as the corn is completely popped. The popper is then disconnected from the electric power source and the cover 14 is removed. Some of the unbuttered popped corn can then be removed as by spooning and the remainder poured into a bowl. With the popper in an inverted position the butter can then be uniformly sprinkled through the openings 50 onto the popped corn contained in the bowl.

Inasmuch as the cup 36 and the cap 48 have a low mass, they quickly cool to a sufficiently low temperature so that the popper can be reused in a short time without burning of the butter during the subsequent popping operation. Also, since the cooking oil does not contact the cup 36 the rate of heat transfer to the cup remains constant as contrasted to the prior art type cooker where the collection of oil between the cup and the heating surface alters the heat transfer rate. The present construction also facilitates cleaning of the popper since no oil or deposits therefrom collect around the cup 36.

While the present invention has been described in connection with a particular embodiment thereof, it will be understood that those skilled in the art may make many changes and modifications without departing from the true spirit and scope thereof. Accordingly, the appended claims are intended to cover all such changes and modifications as fall within the true spirit and scope of the present invention.

What is claimed is:

1. A corn popper comprising
a heat conductive vessel having a bottom and a continuous upstanding sidewall integral therewith,
a cup secured to said bottom and having a perforated cover attached thereto, the height of said cup being substantially less than the height of said sidewall, and
a cover removably positioned over the top of said vessel in spaced apart relationship with said cup.

2. A corn popper according to claim 1, wherein said bottom is provided with
a raised central portion on which said cup rests to define in said bottom an annular well spaced below and surrounding said cup.

3. A corn popper according to claim 2, further ccomprising
a plurality of upstanding portions on said bottom, said cup resting on said upstanding portions.

4. A corn popper according to claim 2, wherein
said cup has an upstanding, generally conical central bottom portion.

5. A corn popper according to claim 4, wherein
said cup is a thin walled, metal member.

6. A corn popper according to claim 5, further comprising
a first threaded member depending from the bottom of said cup, and
a second threaded member extending upwardly from the bottom of said vessel for threaded engagement with said first threaded member to removably secure said cup to the bottom of said vessel.

7. A corn popper according to claim 6, wherein said bottom of said vessel is provided with
a plurality of spaced apart raised portions on which said cup rests, the remainder of said cup being spaced from the bottom of said vessel.

8. Acorn popper according to claim 1, comprising
a handle secured to said sidewall of said vessel.

9. A corn popper according to claim 1, comprising
an electric heating element mounted to the bottom of said vessel, and
a plurality of legs depending from said vessel.

* * * * *